United States Patent
Ichiba

(10) Patent No.: US 12,444,129 B2
(45) Date of Patent: Oct. 14, 2025

(54) INFORMATION PROCESSING APPARATUS TO DISPLAY IMAGE OF ILLUMINATED TARGET OBJECT, METHOD OF INFORMATION PROCESSING, AND STORAGE MEDIUM

(71) Applicant: CANON KABUSHIKI KAISHA, Tokyo (JP)

(72) Inventor: Ryota Ichiba, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 143 days.

(21) Appl. No.: 18/052,839

(22) Filed: Nov. 4, 2022

(65) Prior Publication Data
US 2023/0147474 A1    May 11, 2023

(30) Foreign Application Priority Data
Nov. 11, 2021   (JP) .................................. 2021-184348

(51) Int. Cl.
| | |
|---|---|
| G06T 15/50 | (2011.01) |
| G06F 3/14 | (2006.01) |
| G06T 15/04 | (2011.01) |
| G06T 15/20 | (2011.01) |

(52) U.S. Cl.
CPC .............. *G06T 15/506* (2013.01); *G06F 3/14* (2013.01); *G06T 15/04* (2013.01); *G06T 15/20* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2011/0255763 A1* | 10/2011 | Bogoni | G06T 19/00 382/128 |
| 2017/0193690 A1* | 7/2017 | Ha | G06T 15/80 |
| 2020/0396367 A1* | 12/2020 | Segapelli | H04N 23/61 |
| 2021/0109987 A1* | 4/2021 | Avila | G06F 16/9577 |
| 2021/0295602 A1* | 9/2021 | Scapel | G06F 3/04815 |
| 2022/0060638 A1* | 2/2022 | Aizawa | H04N 23/90 |
| 2022/0287669 A1* | 9/2022 | Sudarsky | A61B 6/032 |
| 2022/0343592 A1* | 10/2022 | Delgado | G06T 15/04 |

FOREIGN PATENT DOCUMENTS

| | | |
|---|---|---|
| JP | 2007018173 A | 1/2007 |
| WO | 2007108041 A1 | 9/2007 |
| WO | 2012039441 A1 | 3/2012 |

* cited by examiner

*Primary Examiner* — Aaron M Richer
(74) *Attorney, Agent, or Firm* — Canon U.S.A., Inc. IP Division

(57) ABSTRACT

An information processing apparatus receives an instruction to display a first area of a target object on a screen or an instruction to display a second area, of the target object, smaller than the first area on the screen and displays an image of the target object illuminated with light under an illuminating condition according to an instruction that the receiving circuit receives on the screen.

12 Claims, 10 Drawing Sheets

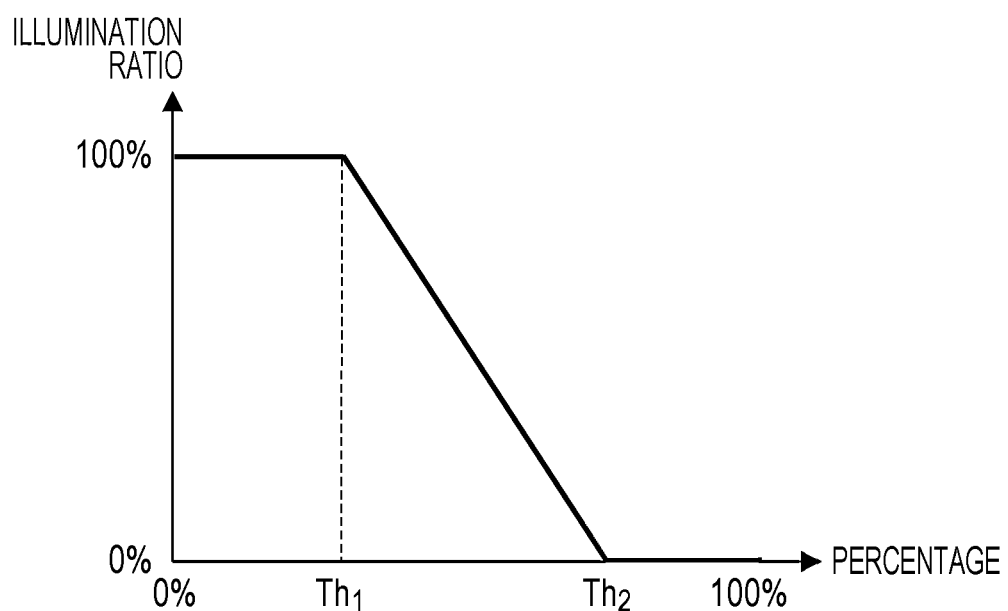

INFORMATION PROCESSING APPARATUS TO DISPLAY IMAGE OF ILLUMINATED TARGET OBJECT, METHOD OF INFORMATION PROCESSING, AND STORAGE MEDIUM

BACKGROUND

Technical Field

One disclosed aspect of the embodiments relates to setting of an illuminating condition in a virtual space.

Description of the Related Art

Improvements in a computer graphic (CG) technique and an image capturing technique have recently made it possible to express the shapes and textures of objects on information terminals. Japanese Patent Laid-Open No. 2007-18173 discloses a technique for operatively connecting the position and orientation of a light source device that a user holds to the position and orientation of a virtual light source.

However, the technique disclosed in Japanese Patent Laid-Open No. 2007-18173 requires the user to move the light source device until an illuminating condition desired by the user are obtained, which may burden the user with the operation on the light source device.

SUMMARY

One disclosed aspect of the embodiments provides a process for setting a desired illuminating condition with a simple user operation.

An information processing apparatus according to an aspect of the disclosure includes a receiving circuit that receives an instruction to display a first area of a target object on a screen or an instruction to display a second area, of the target object, smaller than the first area on the screen and a display control circuit that displays an image of the target object illuminated with light under an illuminating condition according to the received instruction on the screen.

Further features of the disclosure will become apparent from the following description of exemplary embodiments with reference to the attached drawings.

BRIEF DESCRIPTION OF THE DRAWINGS

FIG. 9 is a graph showing the relation between the percentage and the illumination ratio.

DESCRIPTION OF THE EMBODIMENTS

Figure 1:
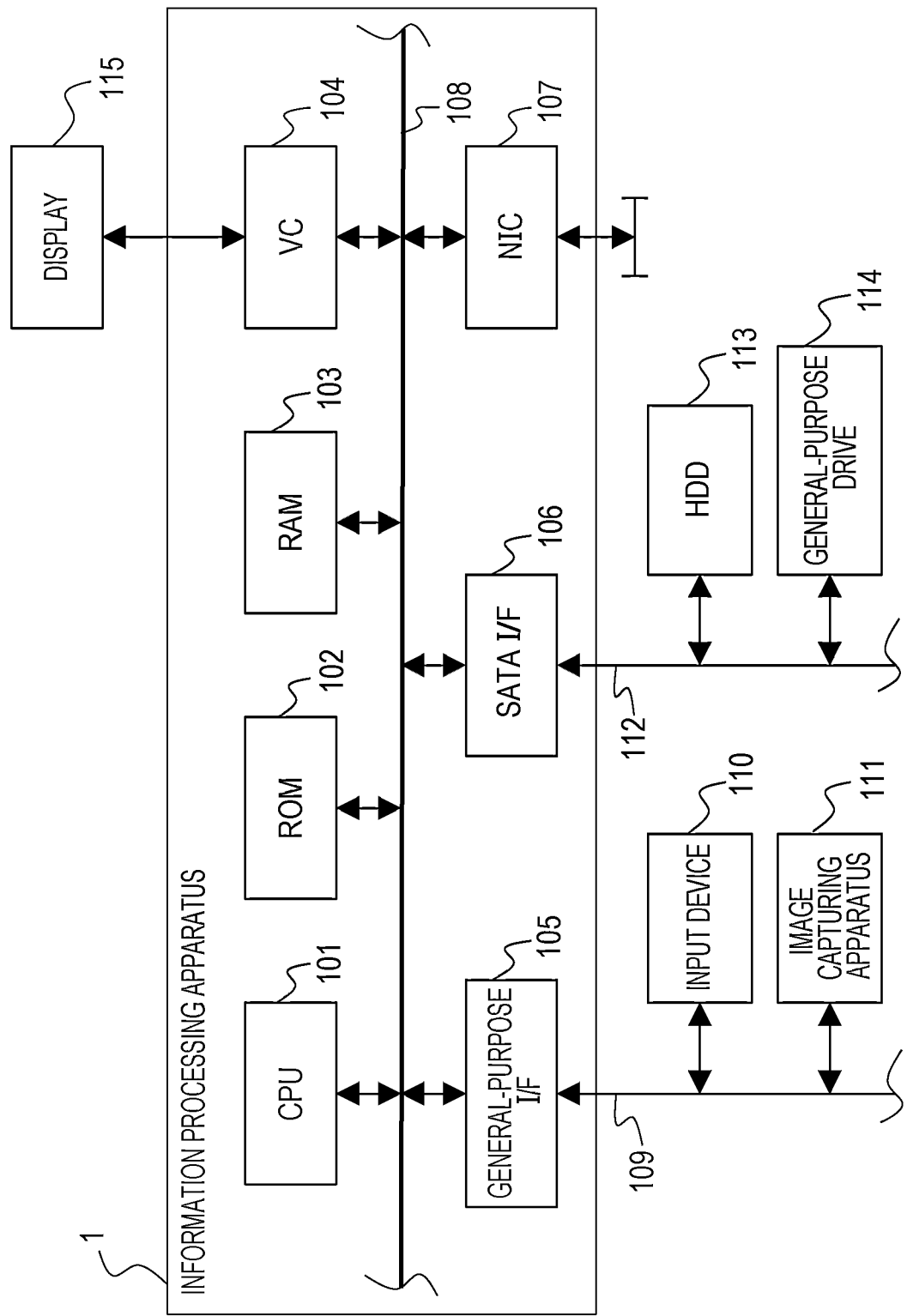
FIG. 1 is a block diagram illustrating the hardware configuration of an information processing apparatus.

Embodiments will be described hereinbelow with reference to the drawings. The following embodiments are not deemed to necessarily limit the disclosure. Not all combinations of the features described in the embodiments are absolutely necessary for the solution of the disclosure. In the following, the term "circuit" may refer to a software context, a hardware context, or a combination of software and hardware contexts. In the software context, the term "circuit" refers to a functionality, an application, a software module, a function, a routine, a set of instructions, or a program that can be executed by a programmable processor such as a microprocessor, a central processing circuit (CPU), or a specially designed programmable device or controller. A memory contains instructions or program that, when executed by the CPU, cause the CPU to perform operations corresponding to circuits or functions. In the hardware context, the term "circuit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "circuit" or "circuit" refers to any combination of the software and hardware contexts as described above. In addition, the term "element", "assembly", "component", or "device" may also refer to "circuit" with or without integration with packaging materials.

First Embodiment

There has recently been a growing demand for checking the shape and texture of products in Internet shopping. For this reason, in displaying an image of a product, it is necessary to replicate the appearance of the product in the actual space. Elements of the appearance of the object to be replicated include the appearance of the product in various indoor and outdoor environments and the detailed shape and texture of the product. The appearance of the product influenced by the surrounding environment can be expressed by illuminating the product with a light source in the environment. The detailed shape and texture of the product can be expressed by illuminating the region of interest of the product. However, the light source in a certain environment does not always illuminate the region of interest of the product, and the appearance of the product in the actual environment may not be expressed only with a virtual light source that illuminates the region of interest. For this reason, it is necessary to check the product under a plurality of illuminating conditions to check both of the appearance of the product and the detailed shape and texture of the product in a certain environment.

For this reason, this embodiment changes the ratio of illumination using a light source in a certain environment to illumination using a virtual light source according to the percentage of a target object in the displayed image. The percentage of the target object can be changed by a simple user operation, such as providing an instruction for enlargement or reduction, so that a desired illuminating condition can be set with less burden.

Hardware Configuration of Information Processing Apparatus

FIG. 1 is a block diagram illustrating the hardware configuration of an information processing apparatus 1. The information processing apparatus 1 includes a central processing unit (CPU) 101, a read-only memory (ROM) 102, and a random-access memory (RAM) 103. The information processing apparatus 1 further includes a video card (VC) 104, a general-purpose interface (I/F) 105, a serial advanced technology attachment (SATA) I/F 106, and a network interface card (NIC) 107. The CPU 101 executes an operating system (OS) and various programs stored in the ROM 102 or a hard disk drive (HDD) 113 using the RAM 103 as a work memory. The CPU 101 controls the components via a system bus 108. The processes of the flowcharts described later are executed by the CPU 101 according to the program codes stored in the ROM 102 or the HDD 113 and developed into the RAM 103. The VC 104 connects to a display 115. The general-purpose I/F 105 connects to an input device 110 including a mouse and a keyboard and to an image capturing unit 111 via a serial bus 109. The SATA I/F 106 connects to the HDD 113 and a general-purpose drive 114 that reads from and writes to various recording media via a serial bus 112. The NIC 107 inputs and outputs information to and from an external device. The CPU 101 uses the various recording media mounted in the HDD 113 and the general-purpose drive 114 as storages for various data. The CPU 101 displays a user interface (UI) provided by a program on the display 115 and receives an input, such as a user instruction, via the input device 110. The display 115 may be a touch panel display having a touch panel function for detecting a touch position of a pointer, such as a finger.

Functional Configuration of Information Processing Apparatus

Figure 2:
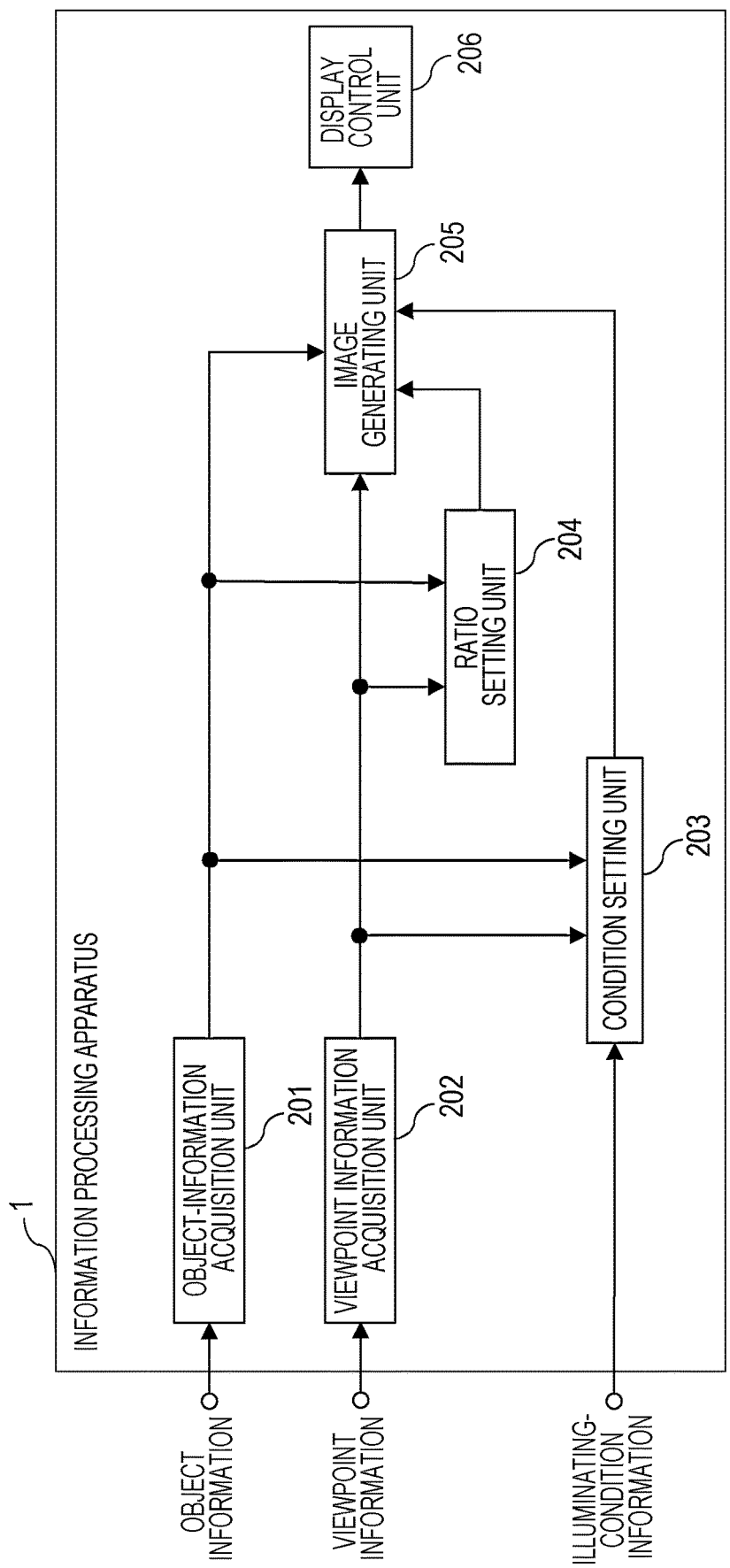
FIG. 2 is a block diagram illustrating the functional configuration of the information processing apparatus.

FIG. 2 is a block diagram illustrating the functional configuration of the information processing apparatus 1. The CPU 101 functions as the functional configuration shown in FIG. 2 by reading and executing programs store in the ROM 102 or the HDD 113 using the RAM 103 as a work memory. Not all of the following processes need to be executed by the CPU 101. The information processing apparatus 1 may be configured so that part or all of the processes are performed by one or a plurality of processing circuits other than the CPU 101.

The information processing apparatus 1 includes an object-information acquisition unit or circuit 201, a viewpoint-information acquisition unit or circuit 202, a condition setting unit or circuit 203, a ratio setting unit or circuit 204, an image generating unit or circuit 205, and a display control unit or circuit 206. The object-information acquisition circuit 201 acquires texture information indicating the texture of a target object and three-dimensional-shape information indicating the three-dimensional shape of the target object. The target object may be any physical object used in the system. It may have a three-dimensional structure. It may be rigid, like a box, a desk, a pen, a chair. It may be flexible, stretchable, bendable, or deformable such as an elastic object. The object-information acquisition circuit 201 acquires, as texture information on the target object, a diffused reflection intensity, a specular reflection intensity, a gloss level, and a normal vector map. The viewpoint-information acquisition circuit 202 acquires, as viewpoint information, the relative position and orientation of a virtual viewpoint relative to the initial position and orientation of the virtual viewpoint. The position and orientation of the virtual viewpoint are changed according to a user instruction via the input device 110. The condition setting circuit 203 acquires a two-dimensional environmental-light map as information on an illuminating condition (hereinafter referred to as "environmental illuminating condition") for expressing the appearance of the target object illuminated with environmental light. The condition setting circuit 203 sets the position and orientation of a virtual light source as an illuminating condition (hereinafter referred to as "texture illuminating condition") for expressing the detailed shape and texture of the target object on the basis of the three-dimensional-shape information and the viewpoint information on the target object. The condition setting circuit 203 sets, as the texture illuminating condition, the position and orientation of the virtual light source so that specular reflection light is reflected from the region of interest on the surface of the target object.

The ratio setting circuit 204 derives the percentage of the target object in the displayed image observed from the virtual viewpoint on the basis of the three-dimensional-shape information and the viewpoint information on the target object. When the percentage of the target object is large, the ratio setting circuit 204 sets the illumination ratio so that the ratio of the texture illuminating condition to the environmental illuminating condition is high. In other words, the case where the target object is displayed large on the screen of the display 115 may suggest that the user wants to check the texture of the target object. For this reason, the ratio of the light that illuminates the region of interest to the environmental light is increased. The image generating circuit 205 generates an image $I_1$ showing the appearance of the target object viewed from the virtual viewpoint in the case where the target object is illuminated under an illuminating condition obtained by mixing the two illuminating conditions according to the illumination ratio. The image generating circuit 205 also generates an image $I_2$ in which a UI is overlapped with the image $I_1$. The display control circuit 206 displays the image $I_2$ on the display 115.

Process Executed by Information Processing Apparatus

Figure 3:
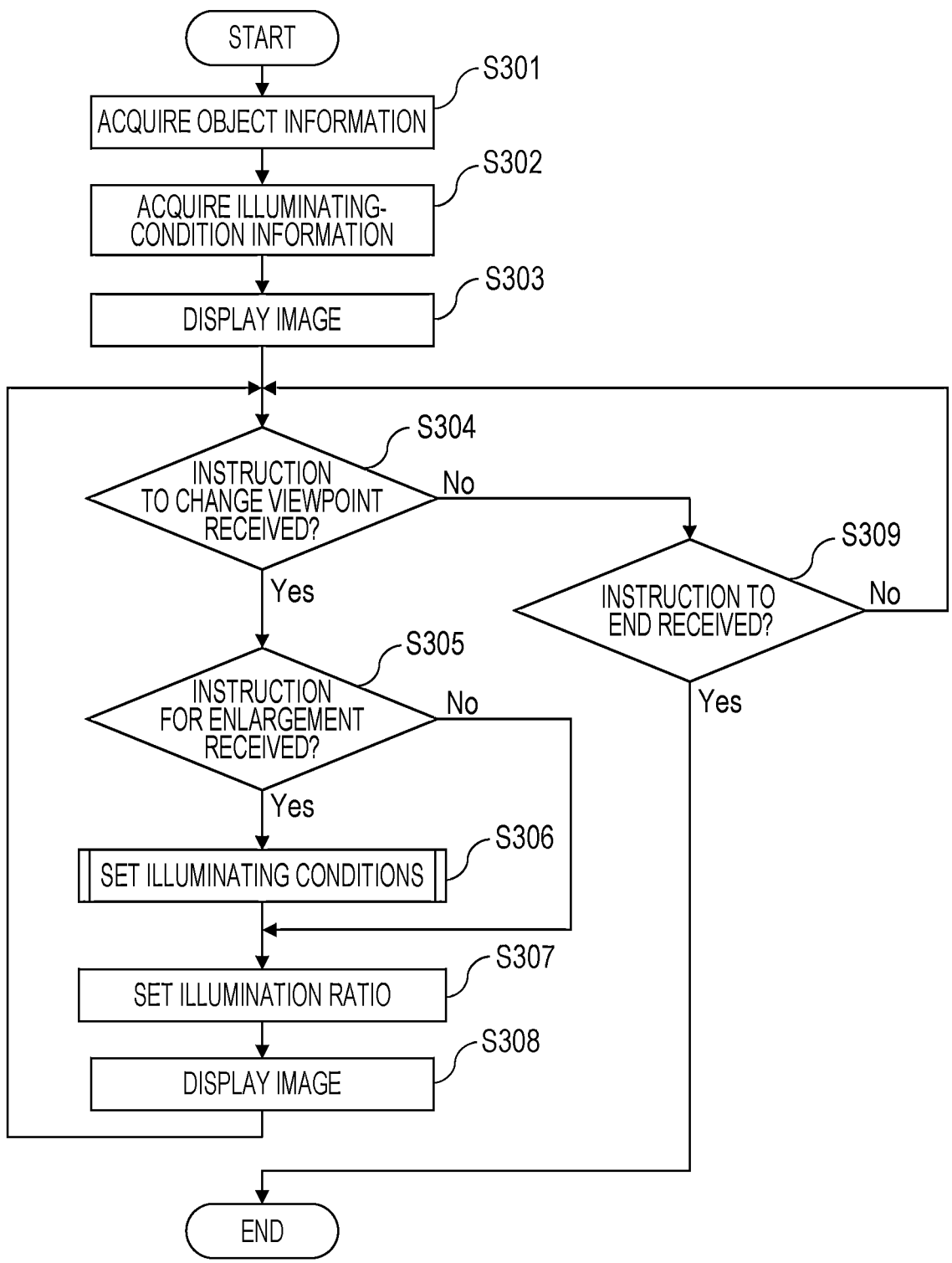
FIG. 3 is a flowchart showing the processing procedure of the information processing apparatus according to a first embodiment.

The processing procedure of the information processing apparatus 1 in this embodiment will be described with reference to the flowchart in FIG. 3. The process in the flowchart of FIG. 3 is started when a user instruction is input via the input device 110, and the CPU 101 receives the input instruction. The steps (processes) are each denoted by S plus a numeral. At S301, the object-information acquisition circuit 201 acquires, as the texture information on the target object, diffused reflection intensity $\rho_d(x,y,i)$, specular reflection intensity $\rho_S(x,y,i)$, gloss level $\sigma(x,y,i)$, and normal $N(x,y,k)$. Specifically, the object-information acquisition circuit 201 acquires the texture information from a storage, such as the HDD 113, according to a user instruction, where (x,y) is the positional coordinates on the surface of the target object, i is a value corresponding to one of a red (R) signal, a green (G) signal, and a blue (B) signal of color signals, and k is a value corresponding to one of an x-component, a y-component, and a z-component in the normal direction. The diffused reflection intensity, the specular reflection intensity, and the gloss level in this embodiment are arrays of values expressed in 8 bits for each positional coordinate and each color signal. The normal direction is an array of values expressed in 8 bits for each positional coordinate and each component, in which values in the range from −1 to 1 of each component are associated with values in the range from 0 to 255. The format of the texture information in this embodiment is illustrative only. For example, the specular reflection intensity may be acquired as 32-bit floating point information. The texture information does not have to be the four kinds of information described above and may be any information that can specify the texture of the target object, for example, two kinds of information, the diffused reflection intensity and the specular reflection intensity, or five or more kinds of information.

The object-information acquisition circuit 201 further acquires three-dimensional-shape information indicating the three-dimensional shape of the target object. The three-dimensional-shape information in this embodiment has, as attribute information, a plurality of three-dimensional shapes as the target object, and Boolean value B that indicates whether each three-dimensional shape influences each of the processes of the condition setting circuit 203 and the ratio setting circuit 204. The three-dimensional-shape information is OBJ file format information that stores the three-dimensional coordinates, and the normal directions of the individual vertices and the like.

Figure 4A:
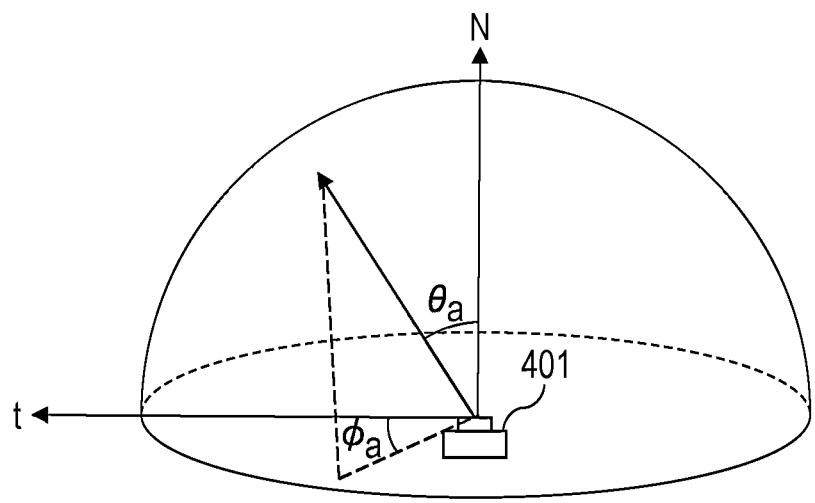
FIGS. 4A and 4B are diagrams illustrating environmental-light maps.
Figure 4B:
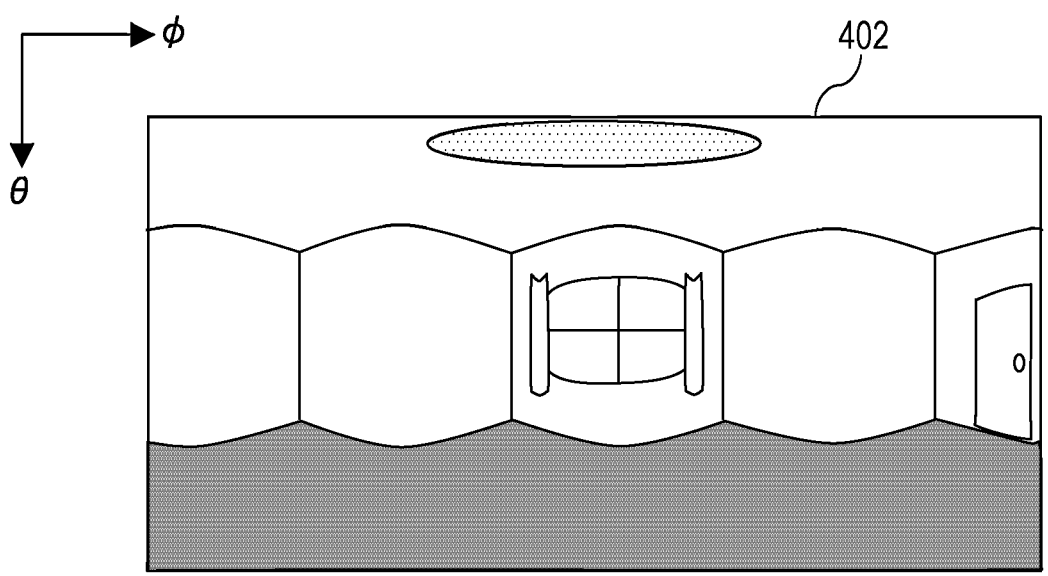

At S302, the condition setting circuit 203 acquires an environmental-light map $E(\theta a, \varphi a, i)$ as illuminating-condition information corresponding to the environmental illuminating condition from a storage, such as the HDD 113, according to a user instruction. FIG. 4A is a diagram illustrating a method of creating the environmental-light map $E(\theta a, \varphi a, i)$. FIG. 4B is a diagram illustrating an example of the created environmental-light map $E(\theta a, \varphi a, i)$. The environmental-light map E can be acquired using an omnidirectional camera 401 installed at any point O. Specifically, the environmental-light map $E(\theta a, \varphi a, i)$ that stores the intensity of light measured for each line-of-sight direction $(\theta_a, \varphi_a)$ and each color signal i is created by measuring the intensity of light from any point O in the line-of-sight direction $(\theta_a, \varphi_a)$, where $\theta_a$ is a polar angle with respect to the normal direction N to the imaging plane and $\varphi_a$ is an azimuth angle with respect to direction t, with the position O on the imaging plane of the omnidirectional camera 401 as the origin. The environmental-light map $E(\theta a, \varphi a, i)$ in this embodiment stores intensity information expressed in 8 bits for each angle and for each color signal. The number of pixels is 1,920×1,080. The format of the illuminating-condition information in this embodiment is illustrative only. For example, the signal intensity of the environmental-light map may be stored as 32-bit floating point information. Thus, an environmental-light map 402 as shown in FIG. 4B can be created using the above method.

At S303, the image generating circuit 205 draws an image $I_1(X,Y,i)$ showing the appearance of the target object illuminated using the environmental-light map $E(\theta a, \varphi a, i)$ on the basis of the initial position and orientation of the virtual viewpoint, where (X,Y) is the pixel coordinates of the two-dimensional image. The position of the virtual viewpoint is determined by three-dimensional coordinates $C_c=(x_c, y_c, z_c)$ in the virtual space. The orientation of the virtual viewpoint is determined by a roll angle $R_c$, a pitch angle $P_c$, and a yaw angle $Y_c$ based on a state in which the line-of-sight direction is a negative direction on the z-axis. The orientation $C_r$ of the virtual viewpoint is expressed as $C_r=(R_e, P_e, Y_e)$. The initial position of the virtual viewpoint is expressed as $C_c=(4h, 4h, 4h)$, where h is the height of a three-dimensional shape which is the target object and the center of which is disposed at the origin, wherein the height h is the difference between the maximum value and the minimum value on the z-axis. The initial orientation of the virtual viewpoint is set so that, for example, the initial orientation faces the origin and the positive direction on the z-axis is aligned with the upward direction of the viewpoint.

The image generating circuit 205 draws the image $I_1(X,Y,i)$ as the appearance of the target object illuminated using the environmental-light map $E(\theta a, \varphi a, i)$ by a known image-based lighting technique. The size of the image $I_1(X,Y,i)$ is 720×720, for example.

Figure 5A:
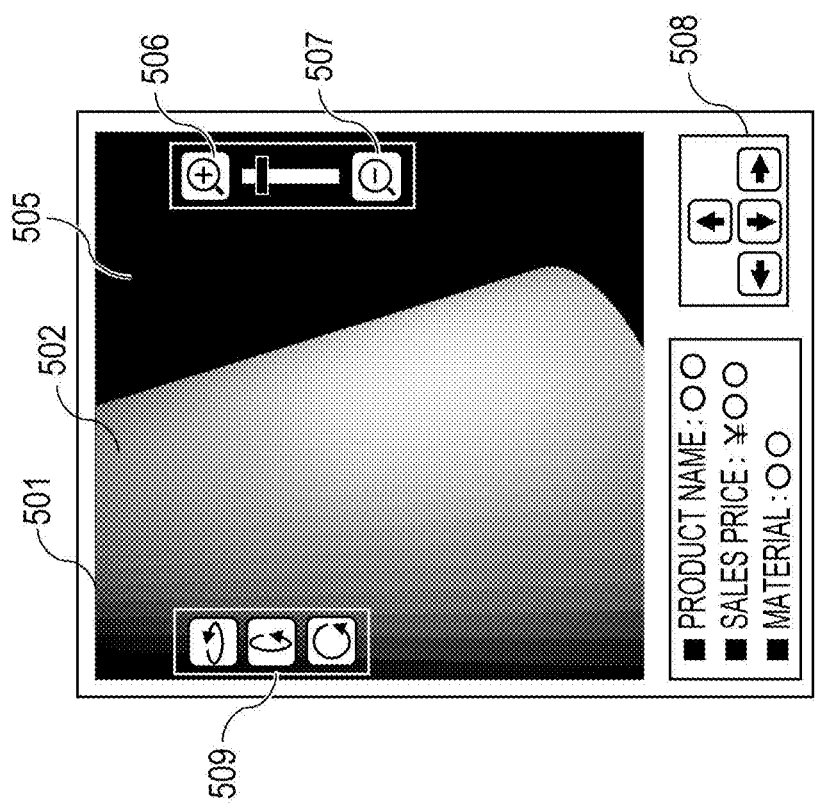
FIGS. 5A and 5B are diagrams illustrating examples of an image displayed on a display.

The image generating circuit 205 further draws an image $I_2(X,Y,i)$ in which an UI is overlapped with the image $I_1(X,Y,i)$. FIG. 5A illustrates an example of the image $I_2$. In this embodiment, a three-dimensional shape 502, a three-dimensional shape 503, and a three-dimensional shape 504 are arranged as target objects in the virtual space. The areas showing the appearances of the three three-dimensional shapes 502-503 and an area 505 with no three-dimensional shape constitute an image $I_1(X,Y,i)$ 501. The image generating circuit 205 draws a zoom-in button 506, a zoom-out button 507, a translate button 508, and a rotate button 509 as UIs for receiving a user instruction to change the position and orientation of the virtual viewpoint. The size of the image $I_2(X,Y,i)$ is 900×1,080, for example. The display control circuit 206 displays the image $I_2(X,Y,i)$ on the display 115.

The process from S304 to S308 is repeated until the viewpoint-information acquisition circuit 202 receives an end instruction from the user. At S304, the viewpoint-information acquisition circuit 202 determines whether an instruction to change the position and orientation of the virtual viewpoint is received from the user. When any one of the zoom-in button 506, the zoom-out button 507, the translate button 508, and the rotate button 509 in FIG. 5A is pressed by the user with the input device 110, the viewpoint-information acquisition circuit 202 determines that an instruction to change the position and orientation is received. If the viewpoint-information acquisition circuit 202 determines that an instruction to change the position and orientation of the virtual viewpoint has been received from user, then the viewpoint-information acquisition circuit 202 changes the position and orientation of the virtual viewpoint according to the instruction from the user. When the zoom-in button 506 is pressed, the viewpoint-information acquisition circuit 202 moves the viewpoint position in the line-of-sight direction to reduce the distance between the three-dimensional shape of the target object present in the line-of-sight direction and the virtual viewpoint by 10% without changing the viewpoint orientation. When the zoom-out button 507 is pressed, the viewpoint-information acquisition circuit 202 moves the viewpoint position in the line-of-sight direction to increase the distance between the three-dimensional shape of the target object present in the line-of-sight direction and the virtual viewpoint by 10% without changing the viewpoint orientation. When the translate button 508 is pressed, the viewpoint-information acquisition circuit 202 moves the viewpoint position in the direction of the arrow button pressed on a plane perpendicular to the line-of-sight direction without changing the viewpoint orientation. The distance of the translation is 10% of the distance between two farthest points of a vertex group constituting the target object. When the rotate button 509 is pressed, the viewpoint-information acquisition circuit 202 rotates the virtual viewpoint 15 degrees in the axial direction of the pressed rotate button 509 about the origin of the virtual space. The above methods for changing the position and orientation of the virtual viewpoint are illustrative only, and the moving distance and the rotation angle may be other values.

If the viewpoint-information acquisition circuit 202 determines that an instruction to change the position and orientation of the virtual viewpoint has not received from the user, then the viewpoint-information acquisition circuit 202 goes through the procedure to S309 and determines whether an end instruction has been received from the user. If the viewpoint-information acquisition circuit 202 determines that an end instruction from the user has not been received, the viewpoint-information acquisition circuit 202 returns the process to S304. If the viewpoint-information acquisition circuit 202 determines that an end instruction from the user has been received, then the viewpoint-information acquisition circuit 202 ends the process.

At S305, the viewpoint-information acquisition circuit 202 determines whether a zoom-in instruction has been received from the user. If the zoom-in button 506 in FIG. 5A is pressed by the user, the viewpoint-information acquisition circuit 202 determines that a zoom-in instruction has been received. If the viewpoint-information acquisition circuit 202 determines that a zoom-in instruction has been received from the user, then the process goes to S306. If the viewpoint-information acquisition circuit 202 determines that a zoom-in instruction has not been received from the user, the process goes to S307. If the distance between the virtual viewpoint and the target object decreases, then the viewpoint-information acquisition circuit 202 may determine that a zoom-in instruction has been received.

Figure 6:
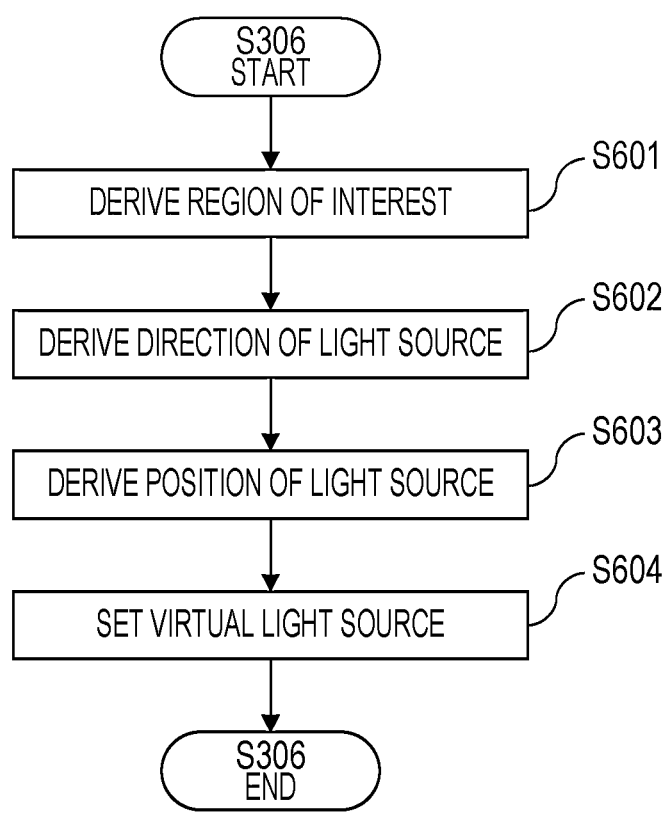
FIG. 6 is a flowchart showing the process of setting the position and orientation of a virtual light source.

At S306, the condition setting circuit 203 sets the position and orientation of the virtual light source as the texture illuminating condition. FIG. 6 is a flowchart showing the details of the process at S306. At S601, the condition setting circuit 203 derives the region of interest on the surface of the target object on the basis of the position and orientation of the virtual viewpoint and the shape of the target object. The condition setting circuit 203 of this embodiment sets an intersection $O=(x_0, y_0, z_0)$) closest to the virtual viewpoint among the intersections of a half line extending from the virtual viewpoint in the line-of-sight direction and three-dimensional shapes whose Boolean values B are true as the region of interest. The above method for setting the region of interest is illustrative only. For example, a circular area about the intersection O on the target object may be set as the region of interest. Alternatively, the intersection of a half line translated by a certain distance from the half line extending from the virtual viewpoint in the line-of-sight direction and the surface of the target object may be set as the region of interest.

Figure 7:
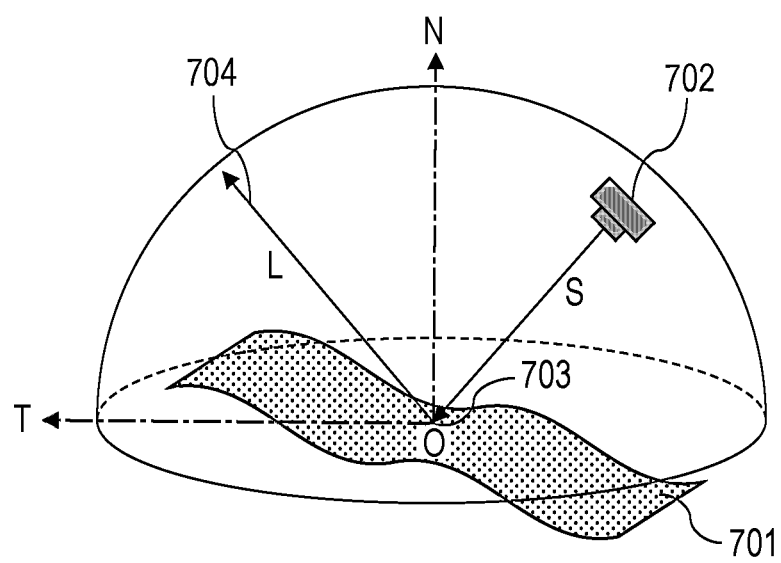
FIG. 7 is a diagram for illustrating the direction of the virtual light source.

At S602, the condition setting circuit 203 derives the direction (orientation) of the virtual light source to be disposed. FIG. 7 is a diagram for illustrating the direction of the virtual light source. A region of interest 703 is set on the surface of a target object 701 as the intersection of the target object 701 and the half line extending from a virtual viewpoint 702 in the line-of-sight direction. The direction 704 of the light source is derived from the target object 701 and the virtual viewpoint 702. A vector S indicating the direction of the virtual viewpoint 702 is derived as Eq. (1).

$$S = O - C_C \qquad \text{Eq. (1)}$$

The direction L of the light source is expressed as Eq. (2).

$$L = O + d(S - 2(S \cdot N)N) \qquad \text{Eq. (2)}$$

where N is a normalized normal vector in the region of interest 703, and the parameter d is a real number greater than or equal to 0.

If the region of interest has an area, the normal vector N may be a vector indicating the average normal direction in the region of interest. The determination of the direction L of the light source allows the user to view specular reflection light in the region of interest, thereby checking the shape and the texture, such as specular reflection intensity.

At S603, the condition setting circuit 203 determines the parameter d to derive the position of the virtual light source to be disposed. The condition setting circuit 203 sets 20 light source positions $L_j$ expressed as Eq. (3) using the direction L of the light source determined at S602.

$$L_j = O + d_j(S - 2(S \cdot N)N) \qquad \text{Eq. (3)}$$

Parameter $d_j$ is determined as in Eq. (4).

$$d_j = a \times \frac{j}{20} \qquad \text{Eq. (4)}$$

where j=1, ..., 20, and a is set as 10 times the height h, for example. The condition setting circuit 203 derives the inner product of the normal vector N at each point in the partial area of the target object viewed from the viewpoint position and the normalized light source position $L_j$ when a point light source is disposed at each light source position and derives the ratios of inner products greater than or equal to a threshold A and inner products less than the threshold A. A light source position whose ratio is closest to a ratio B among the 20 light source positions $L_j$ is set as the light source position. An example of the threshold A is 0.2, and an example of the ratio B is 4:1. By determining the light source position in this way, even if the viewpoint position changes, a shade with substantially the same proportion as that before the change can be given on the surface of the target object viewed from the viewpoint position, allowing the user to check the shape of the target object effectively. The above search method for determining the parameter d is illustrative only, and another optimizing method may be used. At S604, the condition setting circuit 203 disposes the point light source in the orientation derived at S602 at the position derived at S603.

Figure 8A:
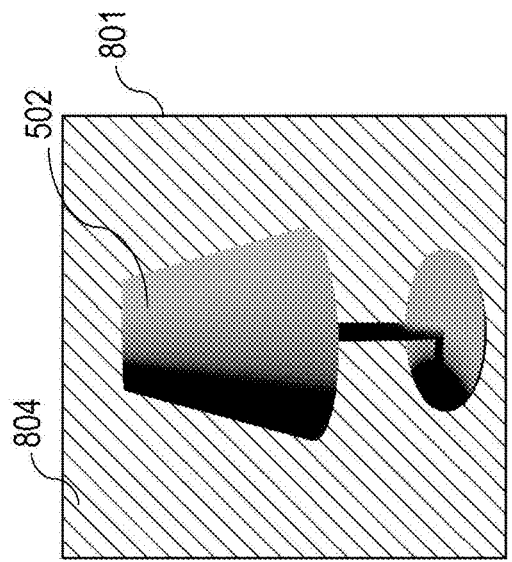
FIGS. 8A, 8B, and 8C are diagrams for illustrating the process of deriving the percentage of the target object in the displayed image.
Figure 8B:
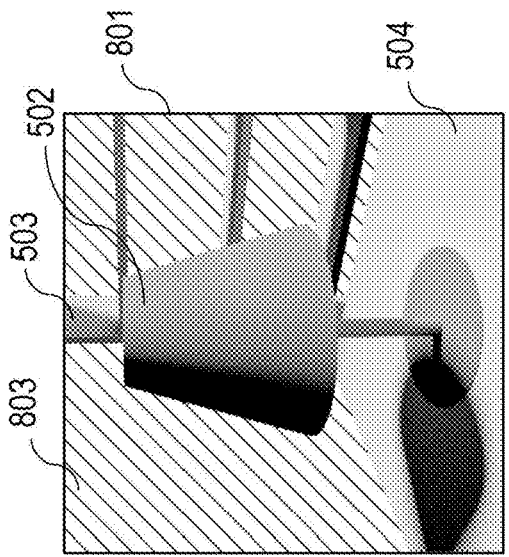
Figure 8C:
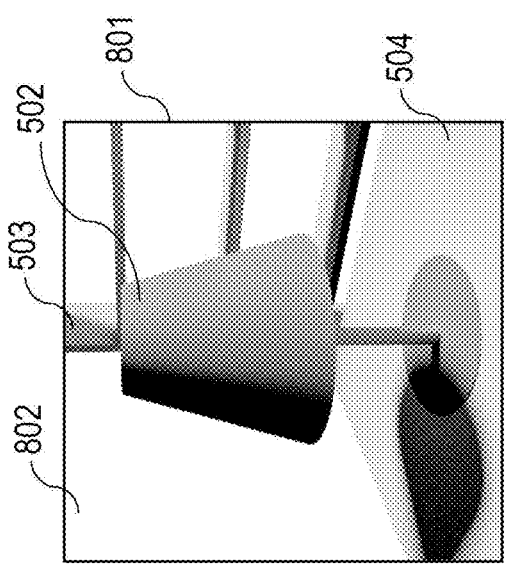

At S307, the ratio setting circuit 204 derives the proportion of the target object in the image $I_1$ as the percentage and sets an illumination ratio for mixing the two illuminating conditions on the basis of the percentage of the target object. FIGS. 8A, 8B, and 8C are diagrams for illustrating the process of deriving the percentage. First, the ratio setting circuit 204 generates an image 801 showing the shield relationship when the target object is viewed from the virtual viewpoint, as in FIG. 8A. In the generation of the image 801, there is no need to give texture information. It is only required to give, for example, a single-color diffused reflection intensity to the surface of the target object. The ratio setting circuit 204 generates the image 801 such that the alpha values indicating the opacity of an area 802 including no three-dimensional shape and a three-dimensional shape whose Boolean value B is false are zero and derives the percentage according to Eq. (5).

$$(\text{Percentage}) = 1 - \frac{(\text{Number of pixels with alpha value of 0})}{(\text{Total number of pixels})} \qquad \text{Eq. (5)}$$

The image 801 has the same size as, for example, the size of the image $I_1(X,Y,i)$. FIG. 8B illustrates an image 801 in which Boolean values B of all of the three three-dimensional shapes are true, and an area 803 is drawn with an alpha value of 0. FIG. 8C illustrates an image 801 in which only one of the three three-dimensional shapes has a true Boolean value B, and the other two have a false Boolean value B, and an area 804 is drawn with an alpha value of 0. To derive the percentage of the target object in the image, the target object and the other (background) are separated using the alpha value. However, any other method that enables to obtain the size of the target object viewed from the virtual viewpoint may be used.

Next, the ratio setting circuit 204 sets the illumination ratio m of the two illuminating conditions on the basis of the percentage of the target object. FIG. 9 shows an example of the relation between the percentage and the illumination ratio. In this example, the percentage $Th_1$ at which the illumination ratio m begins to decrease is 30%, and the percentage $Th_2$ at which the illumination ratio m reaches zero is 80%. Increasing the proportion of the texture illuminating condition as the percentage increases allows, when the target object is displayed small (reduced display) on the screen, the appearance of the entire target object to be checked, and when the target object is displayed large (enlarged display), the texture and the shape of the region of interest to be checked. The relation shown in FIG. 9 is illustrative only. The illumination ratio m may be discretely changed according to the percentage. For example, when both of the percentages $Th_1$ and $Th_2$ are set at 50%, illumination under only the environmental illuminating condition and illumination under only the texture illuminating condition switch discretely at about percentage 50%. In this case, the user can clearly recognize the switching of the illuminating conditions.

At S308, the image generating circuit 205 generates the image $I_1(X,Y,i)$ showing the appearance of the target object viewed from the virtual viewpoint when the target object is illuminated under an illuminating condition obtained by mixing the two illuminating conditions on the basis of the illumination ratio m. The image generating circuit 205 also generates the image $I_2(X,Y,i)$ in which an UI is overlapped with the image $I_1(X,Y,i)$. Specifically, the image generating circuit 205 first generates the image $i_1(X,Y,i)$ by an image-based writing technique using the environmental illuminating condition as at S303. The image generating circuit 205 further generates the image $i_2(X,Y,i)$ using the texture illuminating condition on the basis of the Blinn-Phong model. The image generating circuit 205 derives the pixel value of the image $I_1(X,Y,i)$ using the illumination ratio m as in Eq. (6).

$$I_1(X,Y,i)=m \times i_1(X,Y,i)+(1-m) \times i_2(X,Y,i) \quad \text{Eq. (6)}$$

Figure 5B:
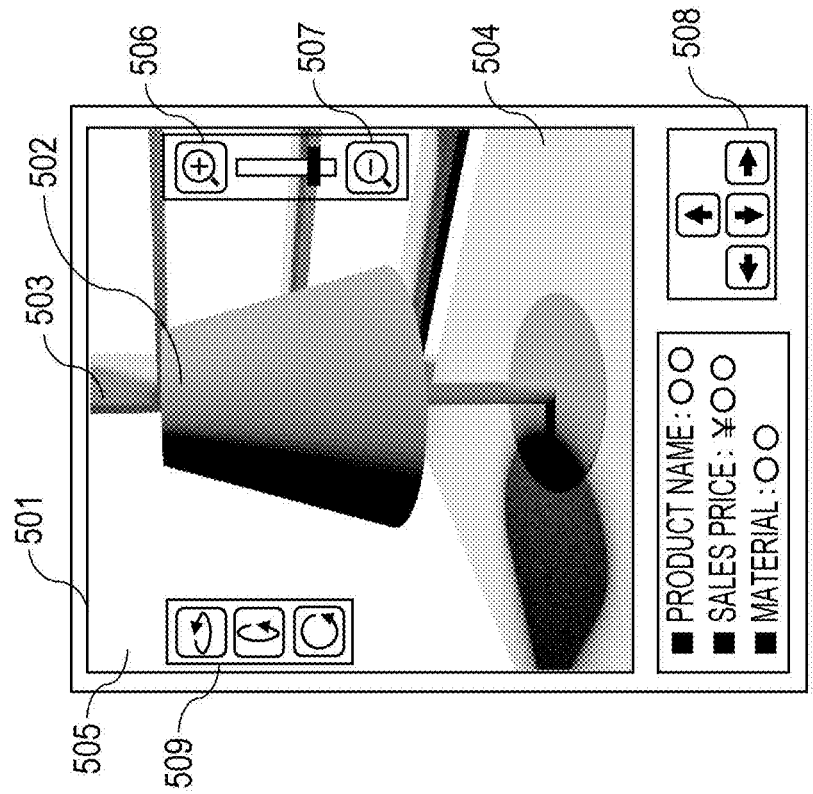

When generating the image $i_t$ and the image $i_2$, the image generating circuit 205 changes the display color of the area including no three-dimensional shape and the transmittances of the three-dimensional shapes other than the three-dimensional shape including the region of interest on the basis of the illumination ratio m. FIGS. 5A and 5B illustrate changes in the background display color and the transmittance of the three-dimensional shape with different illumination ratios m.

The color of the area 505 including no three-dimensional shape is changed and the transmittances of the three-dimensional shape 503 and the three-dimensional shape 504 including no region of interest are increased as the illumination ratio m decreases. Changing the background display color allows the user to recognize which illuminating condition is used for illumination, and changing the transmittances of the three-dimensional shapes prevents the three-dimensional shape that the user views from being shielded by the other three-dimensional shapes. The transmittance of only a three-dimensional shape whose Boolean value B is false may be changed. A description of the UI overlapped with the image $I_1(X,Y,i)$ will be omitted because it is the same as the UI described at S303. The display control circuit 206 displays the image $I_2(X,Y,i)$ on the display 115.

Thus, the information processing apparatus 1 of this embodiment illuminates, when the target object is displayed small on the screen, the target object using an environmental-light map, and when the target object is displayed large on the screen, the region of interest of the target object using a virtual light source. This allows the user to check the appearance of the target object in a certain environment and the shape and texture of the region of interest of the target object without the time and effort to set the light source position and to change the kind of the light source. Furthermore, even if the user target area of the target object is changed, updating the position and orientation of the virtual light source at S306 after receiving a zoom-in instruction allows the virtual light source to be appropriately disposed. Not updating the position and orientation of the virtual light source except when the zoom-in instruction is given prevents flickering generated when the virtual light source is relocated. Furthermore, acquiring the Boolean value B indicating whether to take the three-dimensional shapes into account in setting the illumination at S301 prevents a three-dimensional shape that the user does not intend to view from being illuminated.

Second Embodiment

In the first embodiment, a virtual light source is disposed as the texture illuminating condition to illuminate the target object. This embodiment uses an environmental-light map as the texture illuminating condition. Since the hardware configuration and the functional configuration of the information processing apparatus 1 of this embodiment are the same as those of the first embodiment, descriptions thereof will be omitted. Difference between this embodiment and the first embodiment will be mainly described. The same components as those of the first embodiment are denoted by the same reference signs for description.

Process Executed by Information Processing Apparatus

Figure 10:
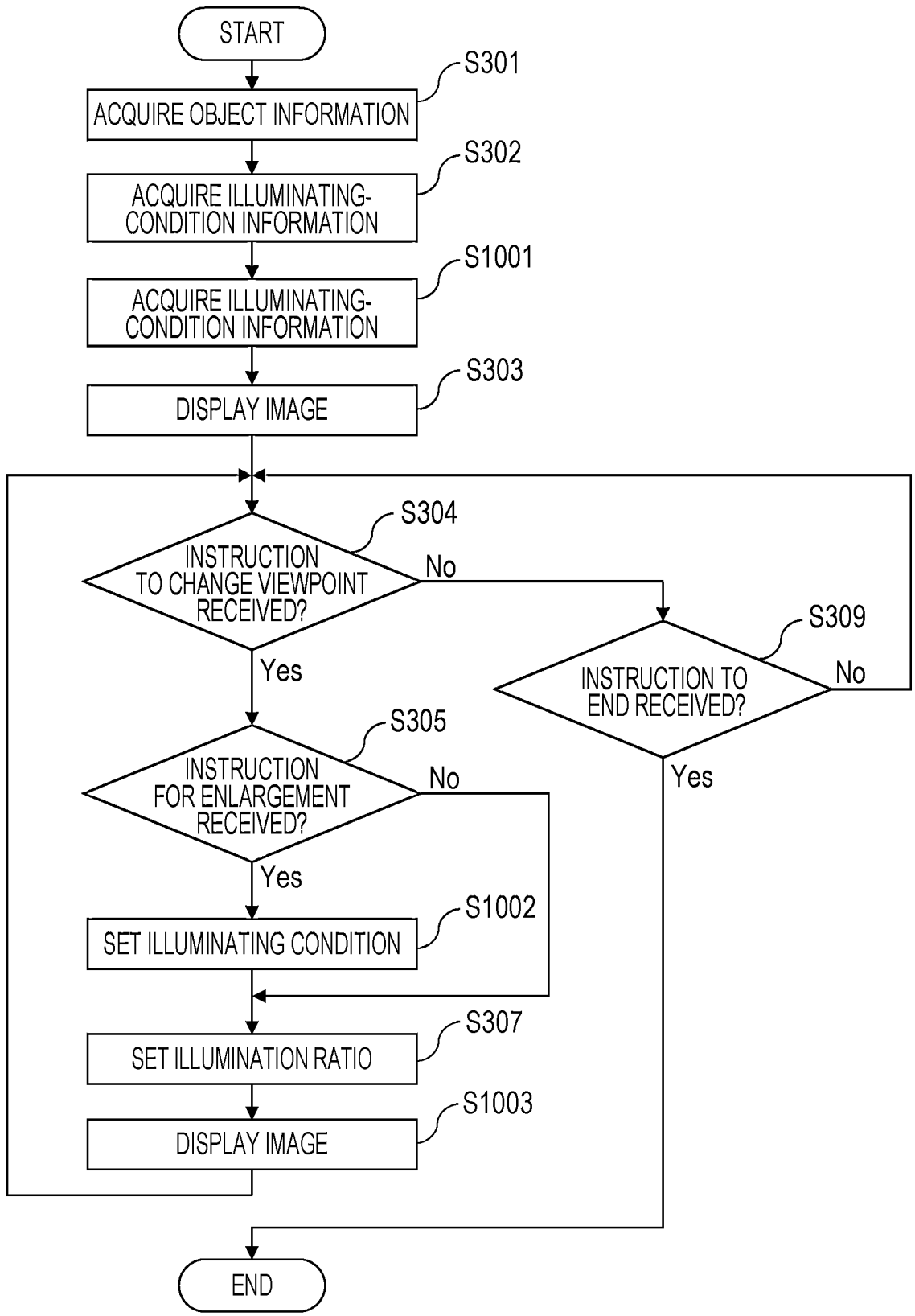
FIG. 10 is a flowchart showing the processing procedure of the information processing apparatus according to a second embodiment.

The processing procedure of the information processing apparatus 1 in this embodiment will be described with reference to the flowchart in FIG. 10. The process in the flowchart of FIG. 10 is started when a user instruction is input via the input device 110, and the CPU 101 receives the input instruction. The processes other than the processes at S1001, S1002, and S1003 are the same as those of the first embodiment, and descriptions thereof will be omitted.

At S1001, the condition setting circuit 203 acquires an environmental-light map $E_2(\theta a, \varphi a, i)$ from a storage, such as the HDD 113, as illuminating-condition information corresponding to the environmental illuminating condition according to a user instruction. The details of the environmental-light map are the same as those described at S302 in the first embodiment. At S1002, the condition setting circuit 203 sets a texture illuminating condition so that the region of interest is illuminated by rotating the environmental-light map $E_2(\theta a, \varphi a, i)$. Since a method for deriving the direction L of the light source is the same as that at S602 of the first embodiment, a description there of will be omitted. The condition setting circuit 203 performs gray-scale transformation of the environmental-light map $E_2(\theta a, \varphi a, i)$ to specify an area with the highest luminance. Specifically, the condition setting circuit 203 converts the environmental-light map $E_2(\theta a, \varphi a, i)$, which is an array having 8-bit intensity information for each coordinate and for each color signal, to an array with luminance values expressed in 8 bits for each coordinate. Since the method of conversion is a known technique, a description thereof will be omitted. The format of the gray-scaled environmental-light map $E_2(\theta a, \varphi a, i)$ is illustrative only. For example, luminance values may be held as 32-bit floating-point information. The condition setting circuit 203 derives coordinates $(\Theta, \Phi)$ having the highest luminance value in the gray-scaled environmental-light map $E_2(\theta a, \varphi a, i)$. The coordinates in the environmental-light map are converted so that an angular component $(\theta_1, \varphi_1)$ when the derived direction L of the light source is displayed in polar coordinates and the coordinates $(\Theta, \Phi)$ coincide.

At S1003, the image generating circuit 205 generates an image $I_1(X,Y,i)$ showing the appearance of the target object viewed from the virtual viewpoint when the target object is illuminated under an illuminating condition obtained by mixing two illuminating conditions on the basis of the illumination ratio m. The image generating circuit 205 also generates an image $I_2(X,Y,i)$ in which an UI is overlapped with the image $I_1(X,Y,i)$. The display control circuit 206 displays the image $I_2(X,Y,i)$ on the display 115. Since the specific process is the same as that of the first embodiment except that the image $i_2(X,Y,i)$ is generated using an image-based writing technique using a texture illuminating condition, a description thereof will be omitted.

Thus, the information processing apparatus 1 of this embodiment illuminates, when the target object is displayed small on the screen, the target object using an environmental-light map, and when the target object is displayed large on the screen, the region of interest of the target object using another environmental-light map. In particular, when the user displays a target object largely on the screen, acquiring the environmental-light map including many light sources and various shapes of light sources as the illuminating-condition information corresponding to a texture illuminating condition allows the user to check the shape and texture of the region of interest because of its rich lighting effects using the virtual light source.

Modifications

In the above embodiments, the UI and the images are displayed using an external display connected to the information processing apparatus 1. Alternatively, a hardware configuration in which the information processing apparatus and a display are formed into a single circuit, such as a tablet, may be used.

In the above embodiment, an instruction for the position and orientation of the virtual viewpoint is received from the user via a UI. Alternatively, when a hardware configuration, such as a tablet, is used, the position and orientation may be acquired using an in-camera, a gyroscope, or the like. An eye-tracking system may be used to acquire the position and orientation of the virtual viewpoint.

In the above embodiments, the light source position under the texture illuminating condition is determined using only the condition setting circuit 203. Furthermore, a change in the light source position may be received from the user via a UI or the like.

In the above embodiments, after the image $i_1$ generated when the target object is illuminated under an environmental illuminating condition and the image $i_2$ generated when the target object is illuminated under a texture illuminating condition are individually generated, the illumination is mixed according to the illumination ratio m. However, the illumination may be mixed using another method. For example, in the first embodiment, the luminance in the environmental-light map corresponding to the environmental illuminating condition is multiplied by m, and the intensity of the light source corresponding to the texture illuminating condition is multiplied by (1−m), an image expressing the appearance of the target object illuminated under the two illuminating conditions may be generated as the image $I_1$.

In the above embodiments, two illuminating conditions are set, and the ratio between the two illuminating conditions is set according to the percentage of the target object in the displayed image. Alternatively, three or more illuminating conditions may be set, and the ratio among the three or more illuminating conditions may be determined according to the percentage.

In the above embodiment, the target object has a plurality of three-dimensional shapes. Alternatively, the target object may have one three-dimensional shape.

In the above embodiments, the process is performed as in the flowcharts in FIGS. 3, 6, and 10. The processing procedures are illustrative only. For example, Steps S301 and S302 may be replaced in order or may be performed in parallel.

In the above embodiments, an image in which a UI is overlapped with an image generated when the environmental-light map is used for illumination is displayed at S303. Alternatively, the UI may be overlapped with an image generated when a virtual light source is used for illumination.

In the above embodiments, the information processing apparatus 1 generates an image according to a user instruction received via the input device 110. Alternatively, the information processing apparatus 1 does not have to generate an image. For example, the information processing apparatus 1 may generate information for setting an illuminating condition according to a zoom-in instruction or a zoom-out instruction and transmit the information to another device, such as a server. The device that has received the information for setting the illuminating condition may generate an image on the basis of the received information and transmit the generated image to the information processing apparatus 1. This reduces the processing load on a terminal that the user uses, such as a smartphone or a tablet.

In the above embodiments, a zoom-in instruction and a zoom-out instruction are used as instructions to display a large area and a small area of the target object, respectively, on the screen. However, the instructions are illustrative only. Examples include an instruction to display the entire target object and an instruction to display part of the target object. If the target object is a vehicle, a UI with which the whole of the body, a bumper, or a hood can be selected, is displayed on the screen. If the whole of the body is selected, the target object may be illuminated using an environmental-light map. If a component, such as a bumper or a hood, is selected, the target object may be illuminated using a virtual light source.

In the first embodiment, the Blinn-Phong model is used as a method for generating the image $i_2$ formed when the target object is illuminated under the texture illuminating condition. Alternatively, another model may be used. Examples include the Torrance-Sparrow model or approximation using a Gaussian function.

In the first embodiment, a point light source is disposed as the texture illuminating condition. Alternatively, a virtual light source, such as a spot light source or an area light source, may be disposed. In this case, the orientation of the virtual light source is determined so as to illuminate the region of interest. An environmental-light map with a similar illuminating condition may be generated to illuminate the region of interest. In this case, the luminance in the vicinity of the positional coordinates in the environmental-light map corresponding to the direction of the light source derived by the condition setting circuit 203 is set high, and the luminance of the other area is set low.

In the second embodiment, if the environmental-light map acquired as illuminating-condition information corresponding to the texture illuminating condition is high in luminance in all directions, the coordinates conversion process is not needed.

According to the embodiments of the disclosure, a desired illuminating condition can be set by a simple user operation.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-184348, filed Nov. 11, 2021, which is hereby incorporated by reference herein in its entirety.

What is claimed is:

1. An information processing apparatus comprising:
a receiving circuit that receives an instruction to change a position and orientation of a virtual viewpoint based on an instruction to display a target object on a screen in an enlarged view or an instruction to display the target object on the screen in a reduced view;
an acquisition circuit that acquires three-dimensional shape information indicating a three-dimensional shape of the target object;
a deriving circuit that derives, based on the instruction to change the position and orientation of the virtual viewpoint and the three-dimensional shape information, a percentage of an area occupied by the target object in a displayed image;
a setting circuit that sets, based on the percentage, an illumination ratio for mixing a first illuminating condition in which light is irradiated to the target object from one direction using a virtual spot light source and a second illuminating condition in which light is irradiated to the target object from a plurality of directions using an environmental-light map; and
a display control circuit that adjusts, based on the illumination ratio, the illuminating condition of the displayed image, and displays the displayed image,
wherein a ratio of the first illuminating condition in the illumination ratio in a case where the percentage is a first percentage is larger than the ratio of the first illuminating condition in the illumination ratio in a case where the percentage is a second percentage smaller than the first percentage.

2. The information processing apparatus according to claim 1, wherein the receiving circuit receives an instruction to display a whole of the target object or an instruction to display part of the target object.

3. The information processing apparatus according to claim 1,
wherein the illuminating condition using the environmental-light map is an illuminating condition in a case where a target object disposed in a certain environment is illuminated with a light source included in the environment, and
wherein the illuminating condition using the virtual spot light source is an illuminating condition in a case where a region of interest of the target object is illuminated with the virtual spot light source.

4. The information processing apparatus according to claim 1, wherein the illuminating condition using the virtual spot light source is an illuminating condition in which light specularly reflected from a region of interest of the target object is viewed by a user.

5. The information processing apparatus according to claim 1, wherein the percentage is determined based on a size of the target object in a virtual space when the target object is viewed from a viewpoint.

6. The information processing apparatus according to claim 1, further comprising:
a generating circuit that generates an image of the target object based on information on the position and orientation of the viewpoint.

7. The information processing apparatus according to claim 6, further comprising:
a second acquisition circuit that acquires information on a texture of the target object,
wherein the generating circuit generates an image of the target object based on information on the texture.

8. The information processing apparatus according to claim 6, wherein, when generating the image of the target object, the generating circuit changes transmittance of a target object, of a plurality of target objects, including no region of interest based on the illuminating condition.

9. The information processing apparatus according to claim 6, wherein, when generating the image of the target object, the generating circuit changes, based on the illuminating condition, color of a background in which the target object is not present.

10. The information processing apparatus according to claim 1, further comprising:
a transmitting circuit that transmits information based on an instruction that the receiving circuit receives to another device; and a second receiving circuit that receives an image of the target object illuminated with light under an illuminating condition according to the transmitted information from the other device.

11. A method of information processing comprising:

receiving an instruction to change a position and orientation of a virtual viewpoint based on an instruction to display a target object on a screen in an enlarged view or an instruction to display the target object on the screen in a reduced view;

acquiring three-dimensional shape information indicating a three-dimensional shape of the target object;

deriving, based on the instruction to change the position and orientation of the virtual viewpoint and the three-dimensional shape information, a percentage of an area occupied by the target object in a displayed image;

setting, based on the percentage, an illumination ratio for mixing a first illuminating condition in which light is irradiated to the target object from one direction using a virtual spot light source and a second illuminating condition in which light is irradiated to the target object from a plurality of directions using an environmental-light map; and adjusting, based on the illumination ratio, the illuminating condition of the displayed image, and displaying the displayed image, wherein a ratio of the first illuminating condition in the illumination ratio in a case where the percentage is a first percentage is larger than the ratio of the first illuminating condition in the illumination ratio in a case where the percentage is a second percentage smaller than the first percentage.

12. A non-transitory computer-readable storage medium storing instructions that, when executed by a computer, cause the computer to perform a method of information processing, the method comprising:

receiving an instruction to change a position and orientation of a virtual viewpoint based on an instruction to display a target object on a screen in an enlarged view or an instruction to display the target object on the screen in a reduced view;

acquiring three-dimensional shape information indicating a three-dimensional shape of the target object;

deriving, based on the instruction to change the position and orientation of the virtual viewpoint and the three-dimensional shape information, a percentage of an area occupied by the target object in a displayed image;

setting, based on the percentage, an illumination ratio for mixing a first illuminating condition in which light is irradiated to the target object from one direction using a virtual spot light source and a second illuminating condition in which light is irradiated to the target object from a plurality of directions using an environmental-light map; and adjusting, based on the illumination ratio, the illuminating condition of the displayed image, and displaying the displayed image, wherein a ratio of the first illuminating condition in the illumination ratio in a case where the percentage is a first percentage is larger than the ratio of the first illuminating condition in the illumination ratio in a case where the percentage is a second percentage smaller than the first percentage.

* * * * *